(12) United States Patent
Yersin

(10) Patent No.: US 9,071,181 B2
(45) Date of Patent: Jun. 30, 2015

(54) THREE PHASE BRUSHLESS DC MOTOR SENSOR-LESS CONTROL USING SINUSOIDAL DRIVE METHOD AND APPARATUS

(71) Applicant: Microchip Technology Incorporated, Chandler, AZ (US)

(72) Inventor: Lionel Yersin, Lutry (CH)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 217 days.

(21) Appl. No.: 13/922,026

(22) Filed: Jun. 19, 2013

(65) Prior Publication Data

US 2014/0265964 A1    Sep. 18, 2014

Related U.S. Application Data

(60) Provisional application No. 61/780,372, filed on Mar. 13, 2013.

(51) Int. Cl.
*H02P 6/14*     (2006.01)
*H02P 6/18*     (2006.01)

(52) U.S. Cl.
CPC ..................................... *H02P 6/182* (2013.01)

(58) Field of Classification Search
CPC ............. H02P 6/182; H02P 6/14; H02P 6/16; H02P 6/18; H02P 6/002; H02P 25/083
USPC ..................................................... 318/400.26
See application file for complete search history.

(56) References Cited

U.S. PATENT DOCUMENTS

| 6,462,495 B1 | 10/2002 | Copeland .................. 318/400.35 |
| 2014/0265969 A1* | 9/2014 | Vinay ....................... 318/400.34 |
| 2014/0340009 A1* | 11/2014 | Reynolds et al. ......... 318/400.11 |

OTHER PUBLICATIONS

Lita, Adrian et al., "AN1160: Sensorless BLDC Control with Back-EMF Filtering Using a Majority Function," Microchip Technology Incorporated, 24 pages, Jan. 1, 2012.
International Search Report and Written Opinion, Application No. PCT/US2014/020143, 9 pages, Dec. 1, 2014.

* cited by examiner

*Primary Examiner* — Karen Masih
(74) *Attorney, Agent, or Firm* — Slayden Grubert Beard PLLC

(57) ABSTRACT

Back electromotive force (BEMF) of a brushless DC (BLDC) motor may be determined when using continuous sinusoidal drive by computing the voltage to common (ground) of each phase (3) thereof when a phase current is substantially zero. These phase voltages may be computed from the DC supply voltage and the duty cycle of the pulse width modulation (PWM) drive to each of the motor phases. From the three phase voltages computed at a zero phase current occurrence, each coil voltage may be calculated. The BEMF of that coil is substantially equal to the coil voltage when at zero current. The phase voltages, when computed at a zero current instance, may be used in determining the BEMF. Once the BEMF is determined it may further be used to regulate the motor speed using a K factor of the BLDC motor.

21 Claims, 10 Drawing Sheets

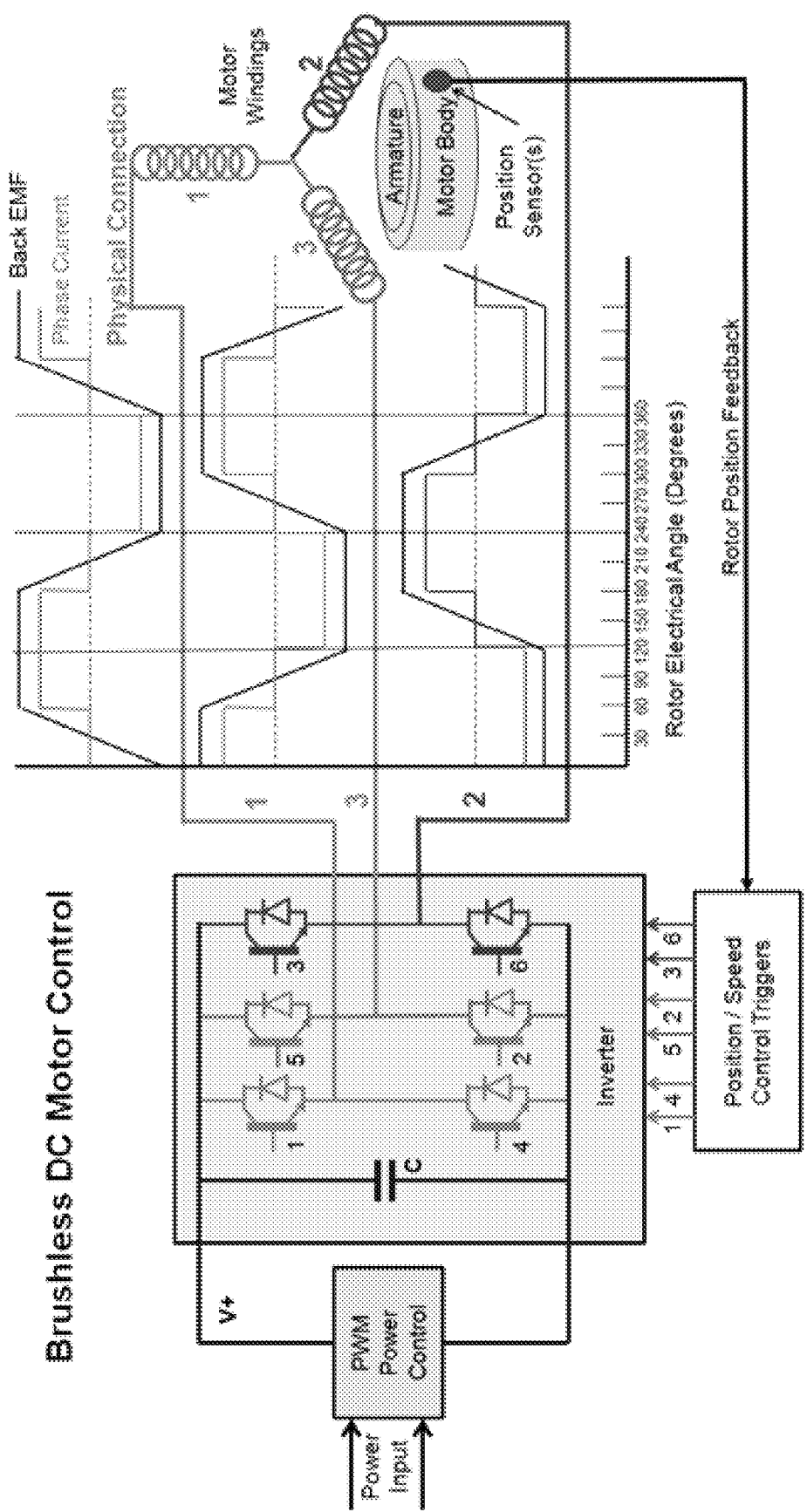
Figure 2 (Prior Technology)

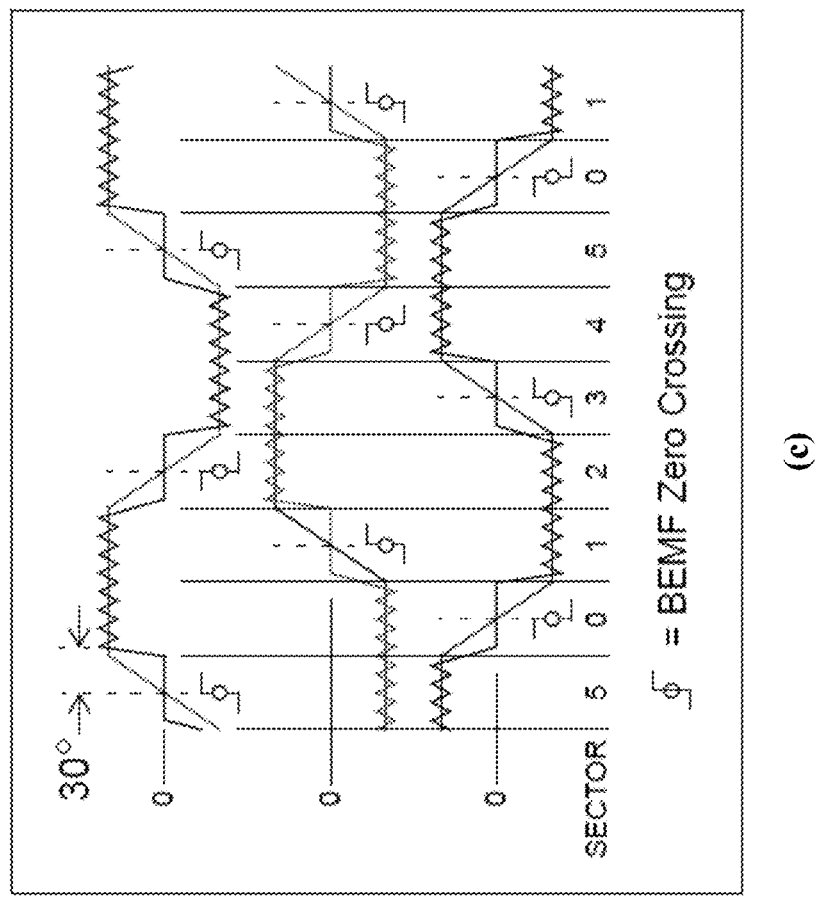
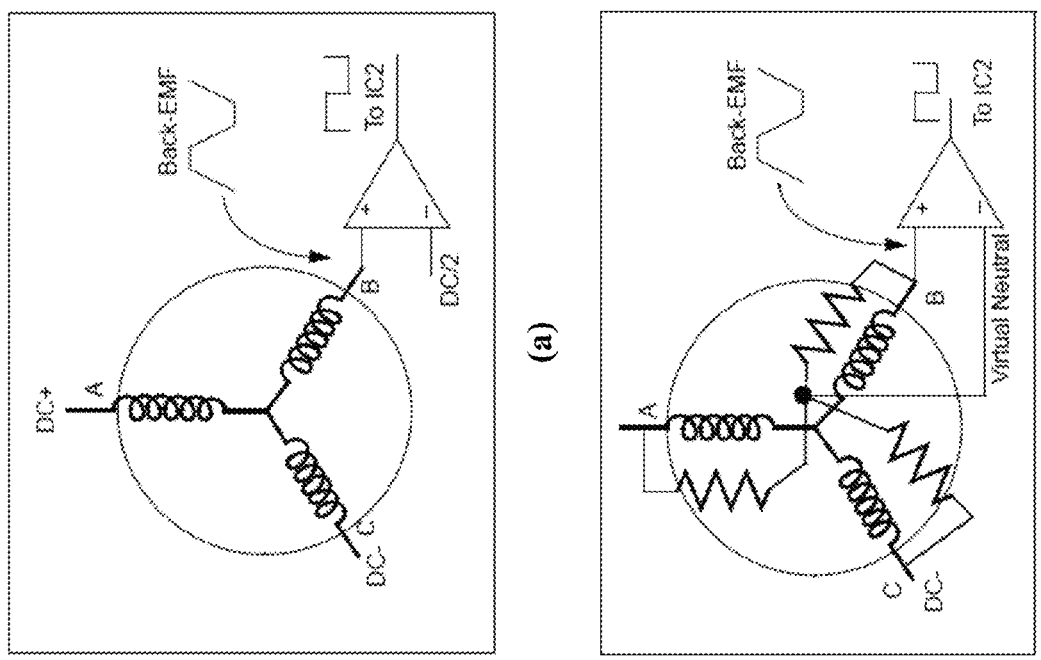
Figure 3 (Prior Technology)

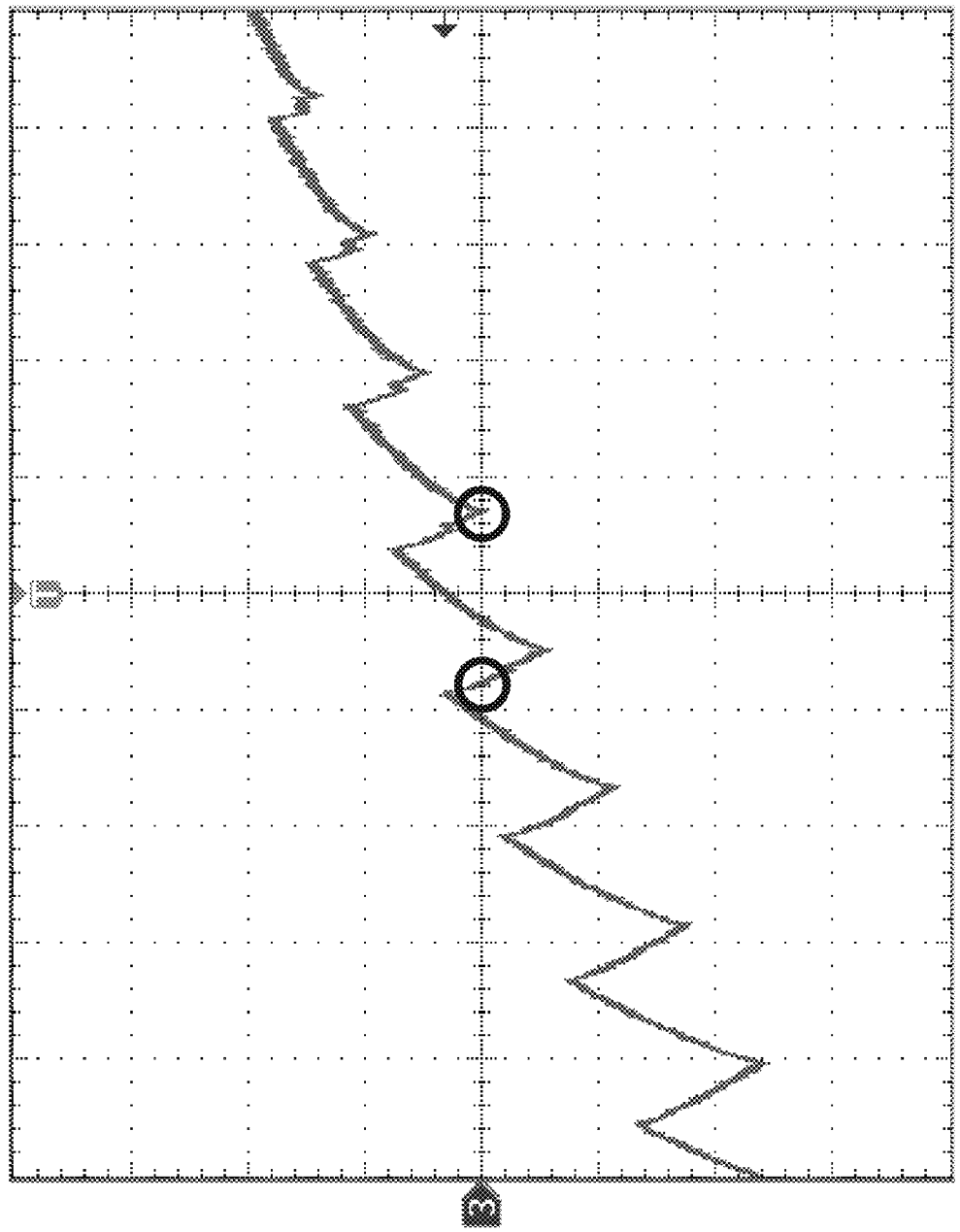
Figure 4 (Prior Technology)

THREE PHASE BRUSHLESS DC MOTOR SENSOR-LESS CONTROL USING SINUSOIDAL DRIVE METHOD AND APPARATUS

RELATED PATENT APPLICATION

This application claims priority to commonly owned U.S. Provisional Patent Application Ser. No. 61/780,372; filed Mar. 13, 2013; entitled "Three Phase Brushless DC Motor Sensor-Less Control Using Sinusoidal Drive Method and Apparatus," by Lionel Yersin, and is hereby incorporated by reference herein for all purposes.

TECHNICAL FIELD

The present disclosure relates to brushless direct current (BLDC) motors, and, more particularly, to three phase BLDC motor sensor-less control using sinusoidal drive.

BACKGROUND

Brushless direct current (BLDC) motors may be used for appliances, automotive, aerospace, consumer, medical, industrial automation equipment and instrumentation applications. BLDC motors do not use brushes for commutation, instead, electronic commutation is used. BLDC motors have advantages over brushed DC motors and induction motors such as: better speed versus torque characteristics, high dynamic response, high efficiency, long operating life, longer time intervals between service, substantially noiseless operation, and higher speed ranges. A more detailed synopsis of BLDC motors may be found in Microchip Application Note AN857, entitled "Brushless DC Motor Control Made Easy;" and Microchip Application Note AN885, entitled "Brushless DC (BLDC) Motor Fundamentals;" both at www.microchip.com; and wherein both are hereby incorporated by reference herein for all purposes.

Referring to FIG. 1, depicted is a waveform diagram of motor phase currents and back electromotive force (BEMF) voltages in a sinusoidal drive. Drive commutation for a BLDC motor may be determined by monitoring the back electromotive force (BEMF) voltages at each phase (A-B-C) of the motor. This is referred to as "zero-crossing" where the BEMF varies above and below the zero-crossing voltage over each electrical cycle. The BEMF frequency is equivalent to the motor speed.

Generally, three-phase BLDC motors use mostly trapezoidal drive, e.g., 120 or 180 degrees drive. A trapezoidal drive induces more torque vibrations and therefore more acoustic noise than a pure sinusoidal drive. The efficiency of the BLDC motor using trapezoidal drive is also lower compared to using sinusoidal drive. Referring to FIG. 2, depicted is a schematic block diagram of a typical BLDC motor drive using pulse width modulation (PWM) to control three high side power MOSFETs and three low side power MOSFETs. Position sensors, e.g., external Hall effect sensors, are used for rotor position and speed determination. However, the trend in controlling BLDC motors is to go sensor-less to keep costs down. There are two main BEMF sensor-less sensing methods, more fully described in Microchip Application Note AN1160, entitled "Sensorless BLDC Control with Back-EMF Filtering Using a Majority Function," at www.microchip.com; and is hereby incorporated by reference herein for all purposes.

Referring to FIG. 3, depicted are schematic connection and timing diagrams for trapezoidal drive of a BLDC motor using sensor-less measure of the BEMF on an un-driven phase (floating phase). A problem with using sensor-less sinusoidal drive is that the BEMF voltage needs to be sensed while the motor is rotating which requires opening a phase to measure the phase voltage referenced to a common point (voltage). Unfortunately, opening a phase creates harmonics in the sine wave drive that results in mechanical vibrations and efficiency loss in the BLDC motor. Most sensor-less sinusoidal drive uses vector control that requires a lot of dedicated hardware as well as high computational power. The vector control uses many phase voltage samples per electrical turn.

There is one BLDC control method that uses a sensor-less sinusoidal drive technique where the three phases are always driven and there is no floating phase. Advantages of sinusoidal drive control are lower noise, lower mechanical vibration and higher efficiency. Drawbacks, however, are higher drive logic complexity; drive speed is limited depending upon the BLDC motor type, driving eight-pole motors are not possible, and weaknesses in motor stall detection. Referring to FIG. 4, depicted is a waveform diagram of current zero-crossing information that is used to get an approximated BEMF (horizontal line shown in FIG. 4). At least two zero-crossings are required (circles on horizontal line shown in FIG. 4), which create limitations and weaknesses in the use of this method of BLDC motor BEMF sensing and control.

SUMMARY

Therefore, a need exists for sensing BEMF of a sensor-less sinusoidal inverter driven BLDC motor that may be implemented with minimal hardware and software computational requirements.

According to an embodiment, a method for determining back electromotive force (BEMF) of a brushless direct current (BLDC) motor may comprise the steps of: detecting a substantially zero current in at least one phase of the BLDC motor; computing each phase voltage of the BLDC motor when the substantially zero current may be detected in the at least one phase of the BLDC motor; averaging the computed phase voltages; and subtracting the averaged computed phase voltages from the computed phase voltage of the at least one phase in which the substantially zero current was detected, wherein the difference thereof may be the BEMF of the at least one phase.

According to a further embodiment of the method, the step of calculating a rotational speed of the BLDC motor may comprise multiplying the BEMF with a motor constant K. According to a further embodiment of the method, the step of adjusting the rotational speed of the BLDC motor may comprise substantially matching a requested rotational speed. According to a further embodiment of the method, the step of adjusting the rotational speed of the BLDC motor may be done with a proportional-derivative (PD) controller. According to a further embodiment of the method, the step of adjusting the rotational speed of the BLDC motor may be done with a proportional-integral-derivative (PID) controller.

According to a further embodiment of the method, the step of averaging a plurality of the BEMFs may be determined from the phase voltages computed during a plurality of detected zero currents in a plurality of phases of the BLDC motor. According to a further embodiment of the method, the step of adjusting the rotational speed of the BLDC motor may comprise the step of using a plurality of time sequential BEMFs. According to a further embodiment of the method, the BLDC motor may be a three phase BLDC motor. According to a further embodiment of the method, the step of computing each phase voltage of the BLDC motor may comprise the steps of multiplying a direct current voltage of a power source by a duty cycle of a pulse width modulation (PWM) drive to each phase of the BLDC motor.

According to another embodiment, a method for determining back electromotive force (BEMF) of a brushless direct current (BLDC) motor may comprise: detecting a substantially zero current in each phase of the BLDC motor; computing each phase voltage of the BLDC motor when the substantially zero current may be detected; averaging the computed phase voltages; and subtracting the averaged computed phase voltages from the phase voltages of the phases in which the substantially zero currents were detected, wherein the differences thereof may be the BEMFs of the respective phases.

According to a further embodiment of the method, the step of calculating a rotational speed of the BLDC motor may comprise multiplying the BEMF by a motor constant K. According to a further embodiment of the method, the step of calculating a rotational speed of the BLDC motor may comprise averaging together the BEMF of each phase of the BLDC motor and multiplying the averaged BEMFs by a motor constant K. According to a further embodiment of the method, the step of adjusting the rotational speed of the BLDC motor may comprise substantially matching a requested rotational speed. According to a further embodiment of the method, the step of adjusting the rotational speed of the BLDC motor may comprise substantially matching a requested rotational speed. According to a further embodiment of the method, the step of adjusting the rotational speed of the BLDC motor may comprise substantially matching a requested rotational speed. According to a further embodiment of the method, the step of adjusting the rotational speed of the BLDC motor may be done with a proportional-derivative (PD) controller. According to a further embodiment of the method, the step of adjusting the rotational speed of the BLDC motor may be done with a proportional-integral-derivative (PID) controller.

According to a further embodiment of the method, the step of averaging a plurality of the BEMFs may be determined from the phase voltages computed during a plurality of detected zero currents in a plurality of phases of the BLDC motor. According to a further embodiment of the method, the step of adjusting the rotational speed of the BLDC motor may comprise the step of using a plurality of time sequential BEMFs. According to a further embodiment of the method, the BLDC motor may be a three phase BLDC motor. According to a further embodiment of the method, the step of computing each phase voltage of the BLDC motor may comprise the steps of multiplying a direct current voltage of a power source by a duty cycle of a pulse width modulation (PWM) drive to each phase of the BLDC motor.

According to yet another embodiment, a system for controlling rotational speed of a brushless direct current (BLDC) motor may comprise: a power source; a three phase sinusoidal power inverter having an input coupled to the power source; a three phase BLDC motor coupled to outputs from the three phase sinusoidal power inverter; zero phase current detectors coupled between each one of the three phases of the BLDC motor and the outputs of the three phase sinusoidal power inverter, wherein each of the zero phase current detectors determines when a respective phase current may be substantially zero; a voltage measurement circuit coupled to the power source for measuring a voltage thereof, wherein phase voltages may be computed therefrom when a zero phase current may be detected; and a motor controller coupled to the zero phase current detectors, the voltage measurement circuit and the three phase sinusoidal power inverter, wherein the motor controller determines a back electromotive force (BEMF) of the three phase BLDC motor from the computed and stored phase voltages, a rotational speed of the BLDC motor from the determined BEMF, and adjusts the three phase sinusoidal power inverter so that the rotational speed of the BLDC motor may be substantially the same as a requested motor rotational speed. According to a further embodiment, the motor controller comprises a microcontroller.

BRIEF DESCRIPTION OF THE DRAWINGS

A more complete understanding of the present disclosure may be acquired by referring to the following description taken in conjunction with the accompanying drawings wherein:

FIG. 2 illustrates a schematic block diagram of a typical BLDC motor drive using pulse width modulation (PWM) to control three high side power MOSFETs and three low side power MOSFETs;

FIG. 3 illustrates schematic connection and timing diagrams for trapezoidal drive of a BLDC motor using sensor-less measure of the BEMF on an un-driven phase (floating phase);

FIG. 4 illustrates a schematic waveform diagram of current zero-crossing information that is used to get an approximated BEMF;

Figure 1:
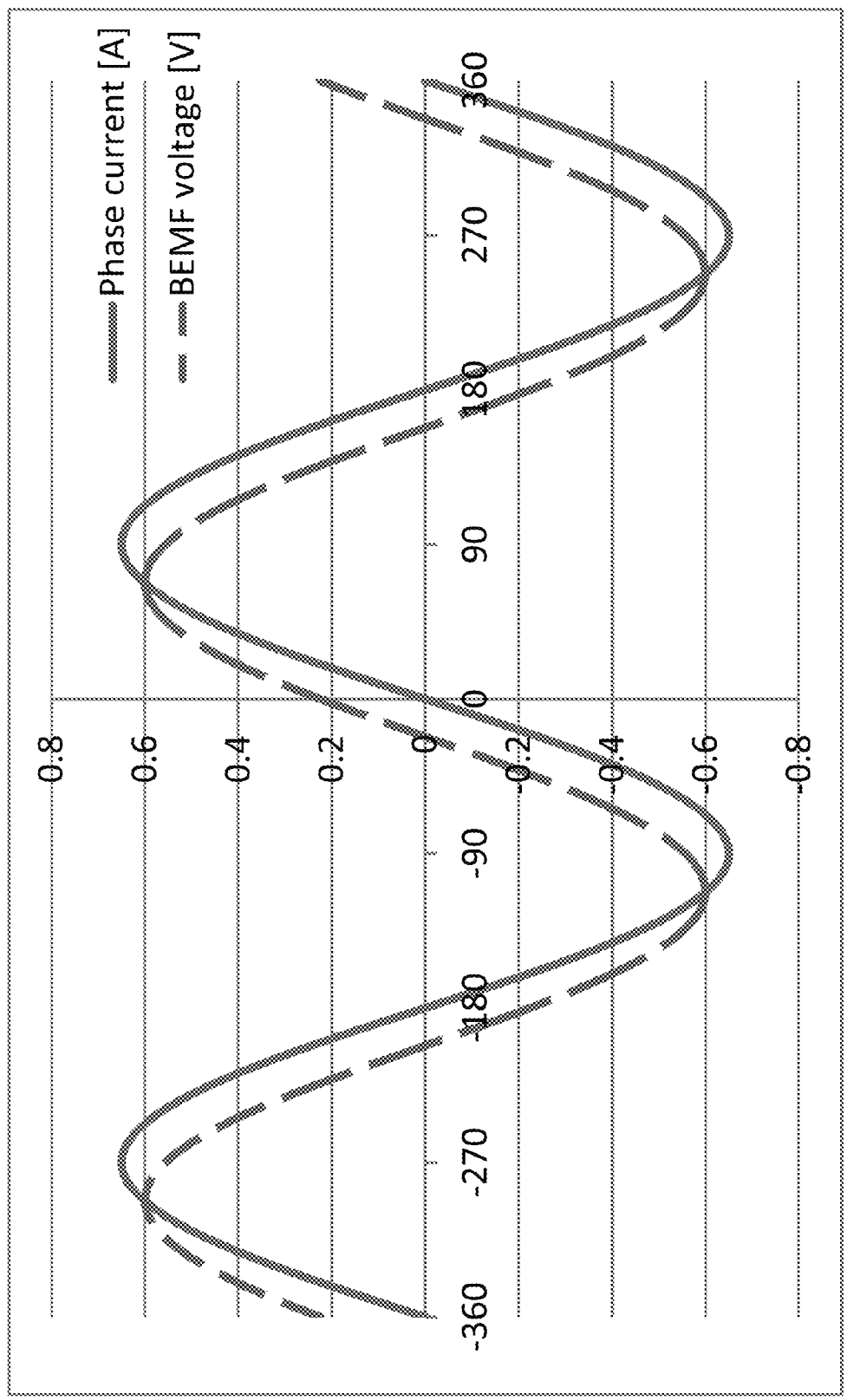
FIG. 1 illustrates a waveform diagram of motor phase currents and back electromotive force (BEMF) voltages in a sinusoidal drive.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

According to embodiments of this disclosure, determining BEMF when using continuous sinusoidal drive to a sensorless BLDC motor may be accomplished by computing each phase voltage based on the PWM duty cycle of each phase and the measured power supply voltage when a phase current is substantially zero. From the three phase voltages, U1, U2 and U3, measured at a zero phase current occurrence, each coil voltage, u1, u2 and u3, may be calculated. The BEMF of that coil is substantially equal to the coil voltage at zero current. Zero currents occur 6 times for each mechanical rotation of a three-phase motor, and one or more coil voltages, when computed at a zero current instance, may be used in determining the BEMF. Once the BEMF is determined it may be further used to regulate the motor using a K factor of the motor. Each motor phase is continuously driven with a synthesized sine wave and the only measurements required are voltages of each the phases to ground, e.g., Vss, upon detection of a zero phase current. Determination of only one coil BEMF from the phase voltages when that coil is at zero phase current is required as the other coil BEMFs at respective zero phase currents will be substantially the same.

According to the teachings of this disclosure, advantages of the sinusoidal waveform BLDC controller (regulator) may be for example but is not limited to: higher signal to noise ratio, no speed limitation, reliable stall detection, no external Hall position sensors required, use of a pure sinusoidal drive waveform, high efficiency, low mechanical vibrations of the BLDC motor, no need to sense or connect to a neutral point, lower complexity analog and digital circuitry, and easy to implement with conventional microcontrollers.

Referring now to the drawing, the details of a specific example embodiment is schematically illustrated. Like elements in the drawings will be represented by like numbers, and similar elements will be represented by like numbers with a different lower case letter suffix.

Figure 5:
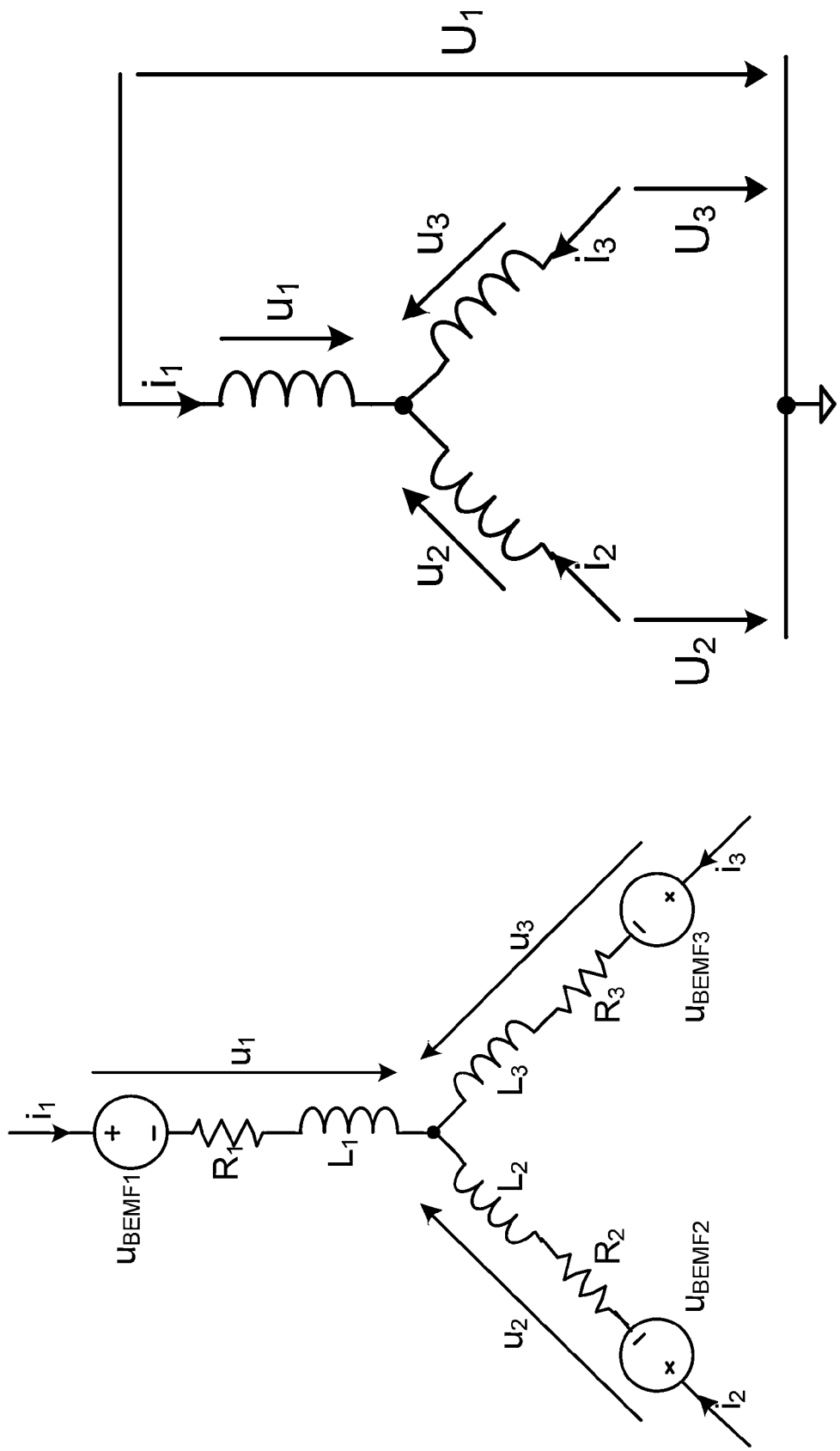
FIG. 5 illustrates schematic diagrams of three-phase WYE connected BLDC motor windings, according to teachings of this disclosure.

Referring to FIG. 5, depicted are schematic diagrams of three-phase WYE connected BLDC motor windings, according to teachings of this disclosure. The three-phase WYE connected BLDC motor windings have electrical relationships according to the following equations:

$$u_{phase} = u_{BEMF} + R * i_{phase} + L * \frac{d\, i_{phase}}{dt}$$

The $u_{BEMF}$ term is the voltage generated by the BEMF resulting in motor rotation. This voltage is related to the motor physical position. When the motor coil (winding) current is crossing zero, the relationship becomes the following:

$$u_{phase} = u_{BEMF} + L*(di_{phase})/dt(i_{phase}=0)$$

Accordingly the $L*(di_{phase})/dt$ term may be neglected, and the relationship now becomes:

$$u_{phase} = u_{BEMF}(i_{phase}=0)$$

The above equation shows that the BEMF voltage may be determined by observing the phase voltages when a phase current is at zero current. Using the naming conventions shown in FIG. 5, the relationship between the phase voltage and the voltage applied to each of the three phases with respect to ground are as follows:

$$u_1 = U_1 - \frac{U_1 + U_2 + U_3}{3}$$
$$u_2 = U_2 - \frac{U_1 + U_2 + U_3}{3}$$
$$u_3 = U_3 - \frac{U_1 + U_2 + U_3}{3}$$

Thus the BLDC motor may be controlled by using the BEMF voltage approximation provided by the above relationships.

Figure 6:
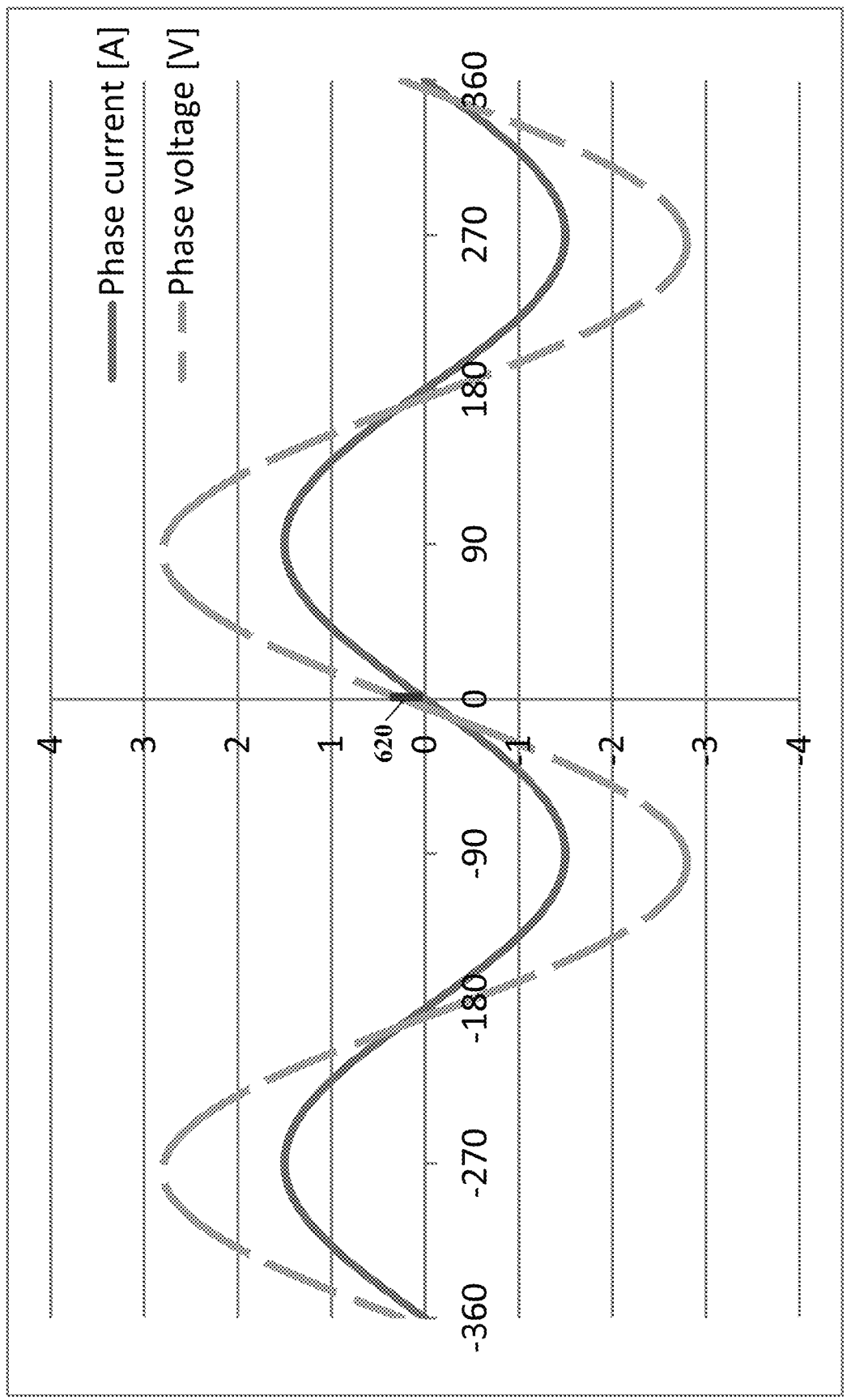
FIGS. 6 and 7 illustrate phase voltage and current waveforms showing the relationship of the current zero-crossings with the phase BEMF voltage, according to the teachings of disclosure.
Figure 7:
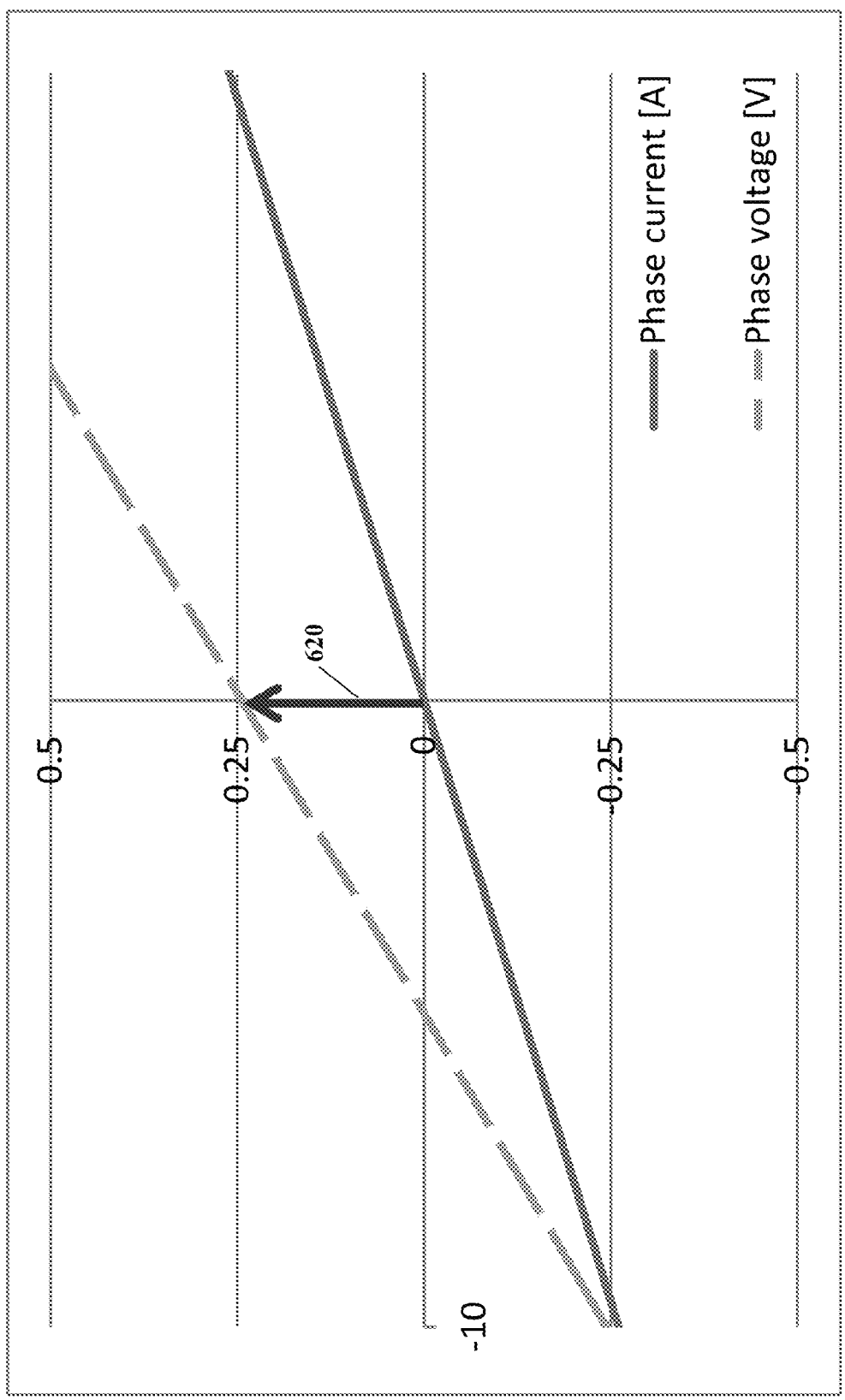

Referring to FIGS. 6 and 7, depicted are phase voltage and current waveforms showing the relationship of the current zero-crossings with the phase BEMF voltage, according to the teachings of disclosure. At a zero phase current, the BEMF voltage 620 may be determined from the relationship of $u_{phase}=u_{BEMF}$ ($i_{phase}=0$). So by computing each of the phase to common voltages, $U_1$, $U_2$ and $U_3$, at any time that there is a zero phase current detected, the BLDC motor BEMF may easily be determined. Phase voltage readings at any one or more occurrence of a zero phase current may be used since there will be six BEMF voltages available per electrical revolution of the BLDC motor, wherein only one set of phase voltage measurements at any zero phase current per electrical revolution is required. A proportional-derivative (PD) or proportional-integral-derivative (PID) controller (regulator) may be used to maintain a desired rotational speed of the BLDC motor by using the determined BEMF voltage thereof, as more fully described hereinafter.

Detection of zero phase current may be accomplished using a simple voltage comparator connected in each of the supply phases A, B, and C. When the low-side MOSFET is "on," the comparator output is the sign of the current flowing into that phase. The BEMF computation is very simple. In the case of zero phase current crossing detected on phase 1:

$$u_{BEMF}=u_1=U_1-(U_1+U_2+U_3)/3$$

Since the power driver is applying $U_1$, $U_2$ and $U_3$, it is easy to get the BEMF approximation.

The phase shift is close to the measured BEMF. The controller (regulator) loop may adapt the BLDC motor drive speed ($\omega$) using a K factor:

$$\omega_{t+1}=\omega_t+K*BEMF$$

The K constant factor depends on the motor BEMF constant which is in millivolts per Hertz (mV/Hz). See Microchip AN857, supra. Thus the controller (regulator) becomes a phase regulator, according to a specific example embodiment of this disclosure. A plurality of determined BEMFs may be averaged in determining the BLDC motor speed, and a plurality of time sequential BEMFs may be used in controlling the rotational speed of the BLDC motor.

Figure 8:
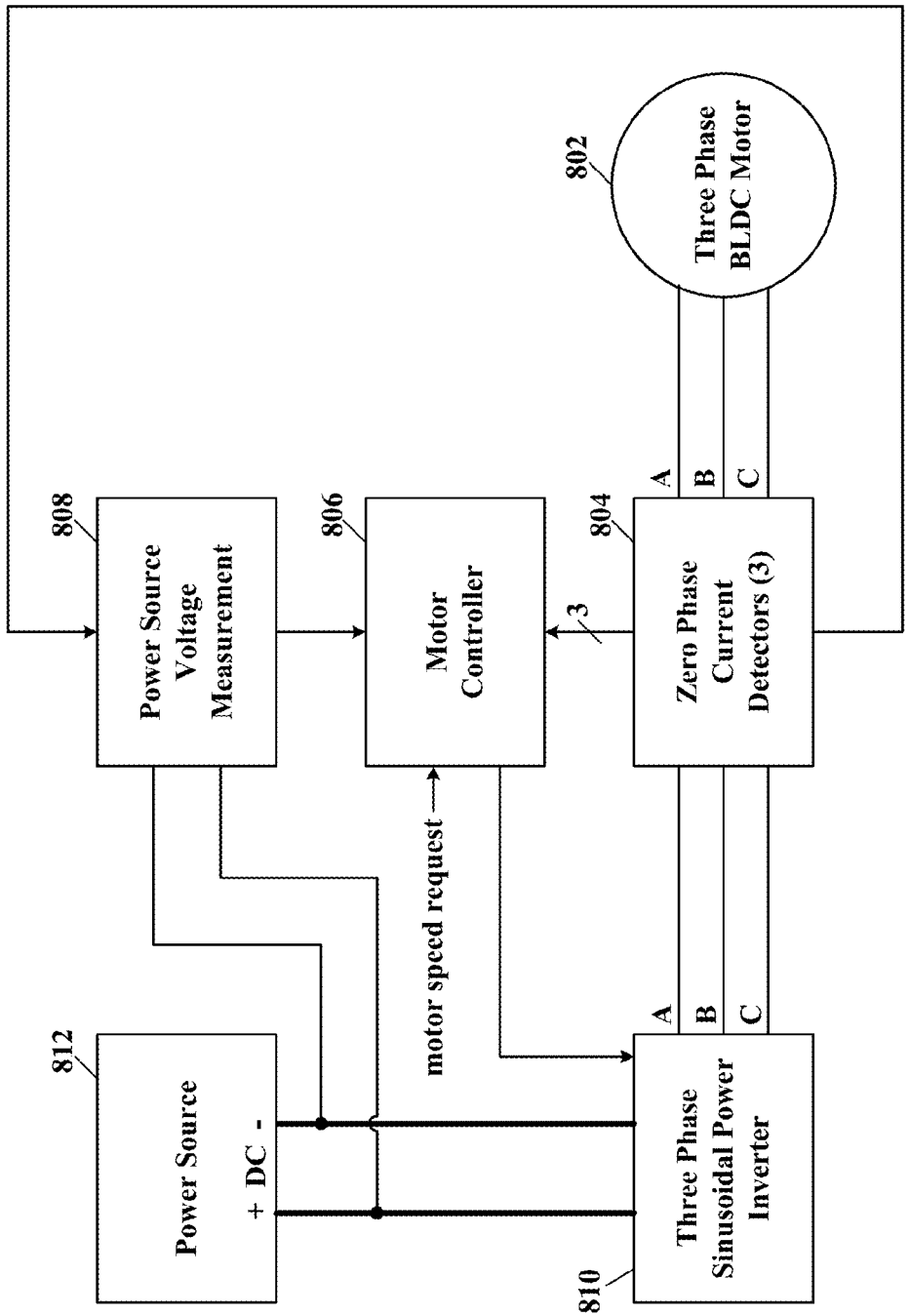
FIG. 8 illustrates a schematic block diagram of a sinusoidal power inverter and controller for a sensor-less BLDC motor, according to a specific example embodiment of this disclosure.

Referring to FIG. 8, depicted is a schematic block diagram of a sinusoidal power inverter and controller for a sensor-less BLDC motor, according to a specific example embodiment of this disclosure. A three-phase sensor-less BLDC motor 802 may be powered (driven) from a three phase sinusoidal power inverter that converts a DC voltage from a power source 812 into three sinusoidal waveforms 120 degrees apart. The three sinusoidal waveforms are coupled to the three-phase sensor-less BLDC motor 802 through three zero phase current detectors 804. The zero phase current detectors 804 will indicate when a phase current is at substantially zero and which one of the phases, A, B, or C, has the zero current. Upon detection of a phase current at a substantially zero current value, a phase voltage capture device 808 may take a voltage sample of the DC voltage from the power source 812, but is not mandatory, e.g., periodic non-synchronized samples or programming the value of the DC voltage, etc., may also be used in calculating the phase voltages from each phase PWM duty cycle. The zero phase current detectors 804 will indicate to the motor controller 806 which phase, A, B, or C, had the zero phase current and the phase voltage capture device 808 will provide to the motor controller 806 the voltage samples taken of the three phase voltages, $U_1$, $U_2$, or $U_3$, at the occurrence of a zero phase current. From this information the motor controller 806 can determine the BEMF, as described hereinabove, of the motor 802, and using the K factor of the BLDC motor determine the drive speed ($\omega$) thereof. Once the BLDC motor drive speed ($\omega$) is known, the motor drive speed ($\omega$) may be compared to a desired motor speed, e.g., motor speed request input, and if there is a difference the motor controller 806 can adjust the speed of the BLDC motor 802.

Figure 9:
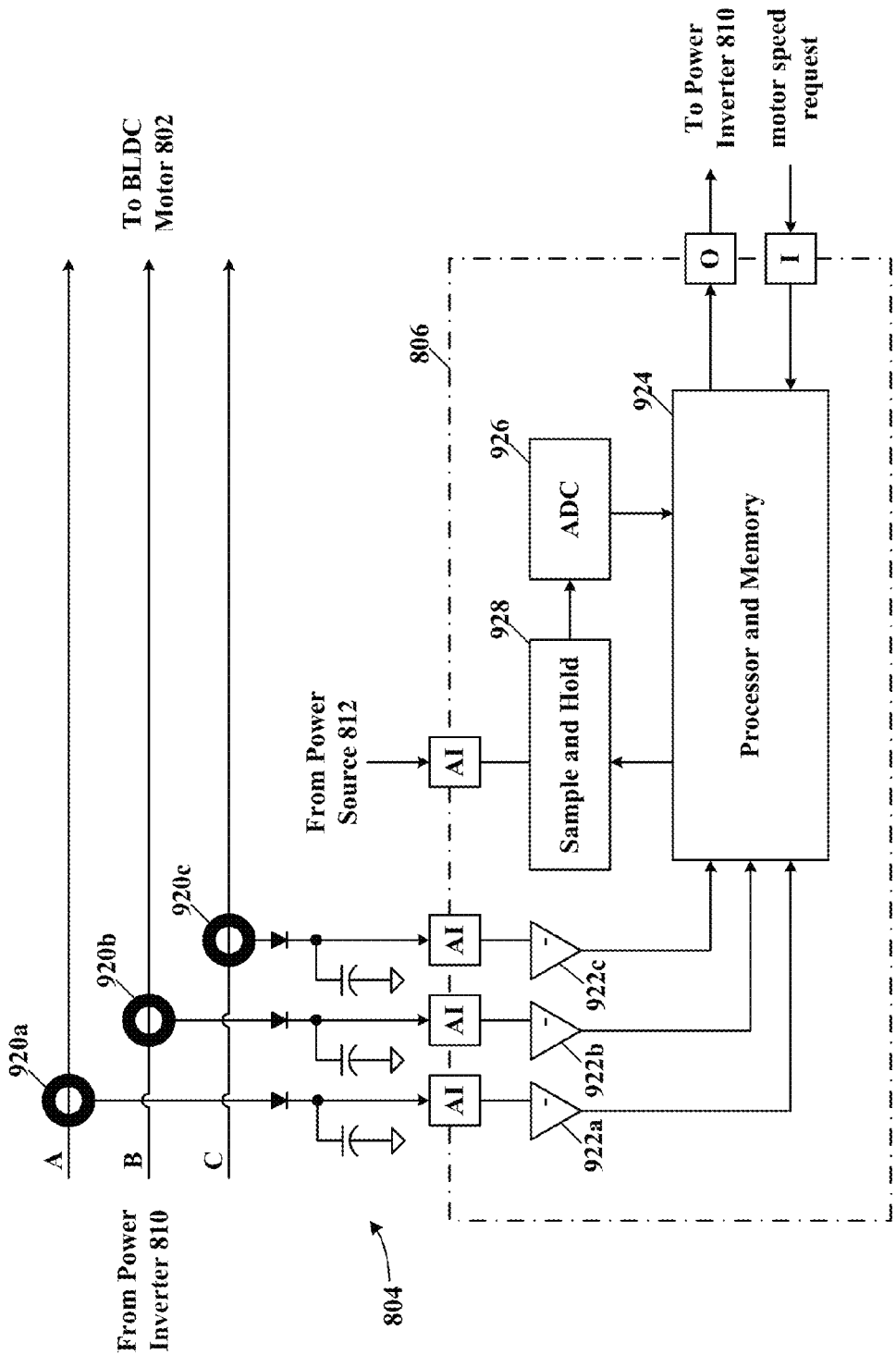
FIG. 9 illustrates a more detailed schematic block diagram of the controller and zero phase current detectors shown in FIG. 8.

Referring to FIG. 9, depicted is a more detailed schematic block diagram of the controller and zero phase current detectors shown in FIG. 8. Current detection of each phase may be done in any number of ways. Shown are current sensor transformers 920, one coupled in each phase of the BLDC motor 802. When there is a current in a phase, the current sensor transformers 920 provide positive DC voltages (rectified by a rectifier and smoothed by a capacitor) to analog inputs of the motor controller 806, e.g., a microprocessor. When a motor phase is drawing substantially no current, then no voltage, e.g., zero volts, is provided to the analog input of the motor controller 806. This may cause a high output from respective voltage comparator 922 coupled to a processor and memory 924 of the motor controller 806. This high output from the comparator 922 may be used as an interrupt to start a phase voltage computation operation at substantially the instant that one of the phase currents is substantially zero. The three phase voltages may be computed from a measured DC voltage from the power source 812 and the duty cycles of the PWM drive voltages to each phase.

After the three phase voltages are computed the processor 924 may determine the BEMF and then, using the K factor of the motor, a rotational speed thereof, as more fully described hereinabove. It is contemplated and within the scope of this disclosure that other ways of detecting substantially zero phase current may be used, e.g., series connected resistors and measuring voltage drop thereacross, may be used, and one having ordinary skill in electronics and the benefit of this disclosure would readily understand how to implement such circuits without undue experimentation.

Figure 10:
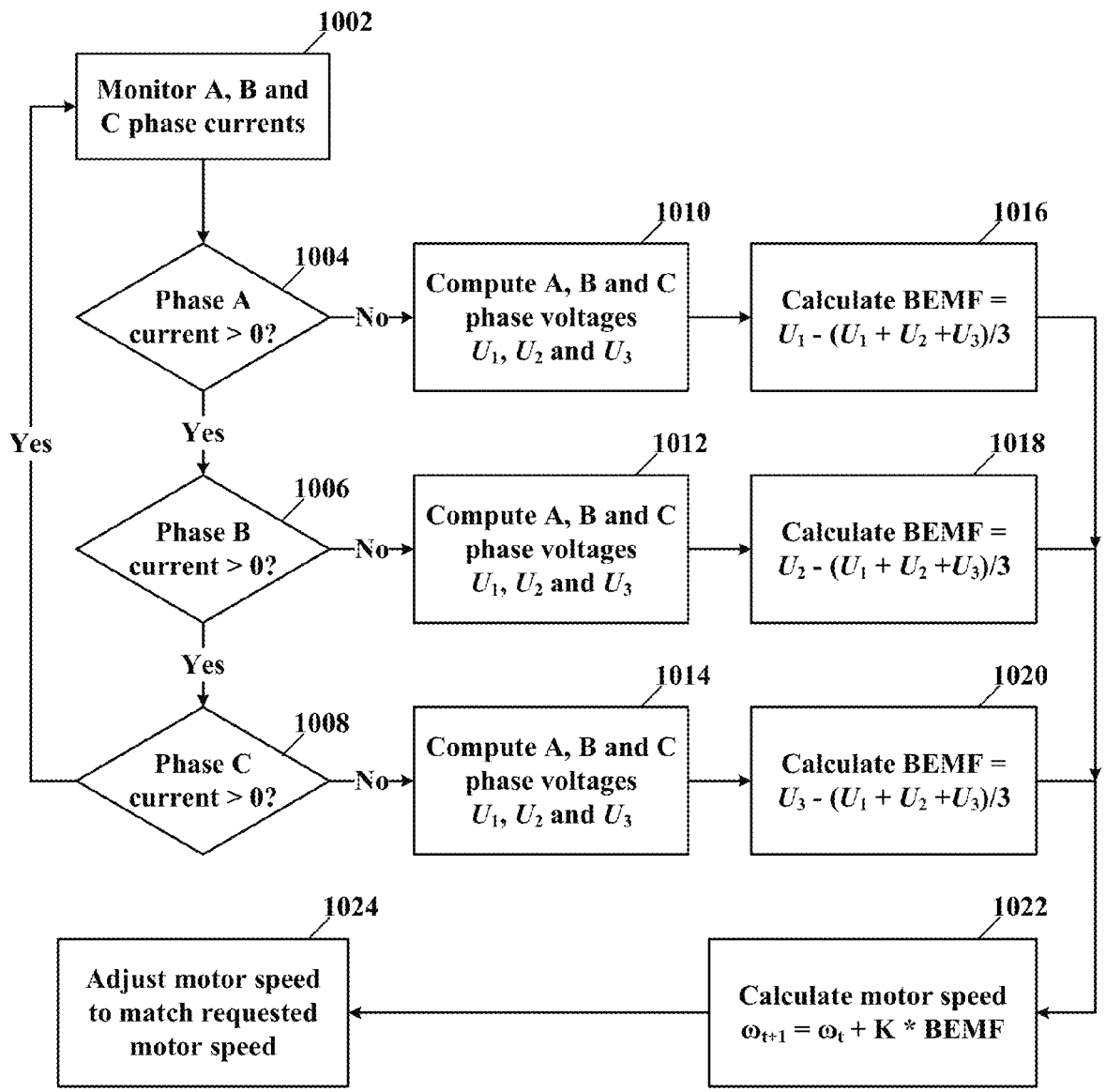
FIG. 10 illustrates a schematic operational flow diagram, according to a specific embodiment of this disclosure.

Referring to FIG. 10, depicted is a schematic operational flow diagram, according to a specific embodiment of this disclosure. In step 1002 the three A, B, and C phase currents are monitored. Step 1004 determines when phase A current is substantially zero. Step 1006 determines when phase B current is substantially zero. And step 1008 determines when phase C current is substantially zero. When a determination is made of a zero phase current in any one of the steps 1004, 1006 or 1008, the phase voltages are computed in steps 1010, 1012, or 1014. Once the phase voltages are computed during a zero phase current event, a BEMF of the motor may be determined in steps 1016, 1018 or 1020 by subtracting the average of the computed three phase voltages. Step 1022 determines the motor speed from the BEMF and the motor K factor. In step 1024 the motor speed may be adjusted if it does not substantially match a requested motor speed.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for determining back electromotive force (BEMF) of a brushless direct current (BLDC) motor, said method comprising the steps of:
   detecting a substantially zero current in at least one phase of the BLDC motor;
   computing each phase voltage of the BLDC motor when the substantially zero current is detected in the at least one phase of the BLDC motor;
   averaging the computed phase voltages; and
   subtracting the averaged computed phase voltages from the computed phase voltage of the at least one phase in which the substantially zero current was detected, wherein the difference thereof is the BEMF of the at least one phase.

2. The method according to claim 1, further comprising the step of calculating a rotational speed of the BLDC motor by multiplying the BEMF by a motor constant K.

3. The method according to claim 2, further comprising the step of adjusting the rotational speed of the BLDC motor to substantially match a requested rotational speed.

4. The method according to claim 3, wherein the step of adjusting the rotational speed of the BLDC motor is done with a proportional-derivative (PD) controller.

5. The method according to claim 3, wherein the step of adjusting the rotational speed of the BLDC motor is done with a proportional-integral-derivative (PID) controller.

6. The method according to claim 2, further comprising the step of averaging a plurality of the BEMFs determined from the phase voltages computed during a plurality of detected zero currents in a plurality of phases of the BLDC motor.

7. The method according to claim 3, wherein the step of adjusting the rotational speed of the BLDC motor comprising the step of using a plurality of time sequential BEMFs.

8. The method according to claim 1, wherein the BLDC motor is a three phase BLDC motor.

9. The method according to claim 1, wherein the step of computing each phase voltage of the BLDC motor comprises the steps of multiplying a direct current voltage of a power source by a duty cycle of a pulse width modulation (PWM) drive to each phase of the BLDC motor.

10. A method for determining back electromotive force (BEMF) of a brushless direct current (BLDC) motor, said method comprising the steps of:
    detecting a substantially zero current in each phase of the BLDC motor;
    computing each phase voltage of the BLDC motor when the substantially zero current is detected;
    averaging the computed phase voltages; and
    subtracting the averaged computed phase voltages from the phase voltages of the phases in which the substantially zero currents were detected, wherein the differences thereof are the BEMFs of the respective phases.

11. The method according to claim 10, further comprising the step of calculating a rotational speed of the BLDC motor by multiplying the BEMF by a motor constant K.

12. The method according to claim 10, further comprising the step of calculating a rotational speed of the BLDC motor by averaging together the BEMF of each phase of the BLDC motor and multiplying the averaged BEMFs by a motor constant K.

13. The method according to claim 11, further comprising the step of adjusting the rotational speed of the BLDC motor to substantially match a requested rotational speed.

14. The method according to claim 13, wherein the step of adjusting the rotational speed of the BLDC motor is done with a proportional-derivative (PD) controller.

15. The method according to claim 13, wherein the step of adjusting the rotational speed of the BLDC motor is done with a proportional-integral-derivative (PID) controller.

16. The method according to claim 11, further comprising the step of averaging a plurality of the BEMFs determined from the phase voltages computed during a plurality of detected zero currents in a plurality of phases of the BLDC motor.

17. The method according to claim 13, wherein the step of adjusting the rotational speed of the BLDC motor comprising the step of using a plurality of time sequential BEMFs.

18. The method according to claim 10, wherein the BLDC motor is a three phase BLDC motor.

19. The method according to claim 10, wherein the step of computing each phase voltage of the BLDC motor comprises the steps of multiplying a direct current voltage of a power source by a duty cycle of a pulse width modulation (PWM) drive to each phase of the BLDC motor.

20. A system for controlling rotational speed of a brushless direct current (BLDC) motor, said system comprising:
 a power source;
 a three phase sinusoidal power inverter having an input coupled to the power source;
 a three phase BLDC motor coupled to outputs from the three phase sinusoidal power inverter;
 zero phase current detectors coupled between each one of the three phases of the BLDC motor and the outputs of the three phase sinusoidal power inverter, wherein each of the zero phase current detectors determines when a respective phase current is substantially zero;
 a voltage measurement circuit coupled to the power source for measuring a voltage thereof, wherein phase voltages are computed therefrom when a zero phase current is detected; and
 a motor controller coupled to the zero phase current detectors, the voltage measurement circuit and the three phase sinusoidal power inverter,
 wherein the motor controller
  determines a back electromotive force (BEMF) of the three phase BLDC motor from the computed and stored phase voltages,
  determines a rotational speed of the BLDC motor from the determined BEMF, and
  adjusts the three phase sinusoidal power inverter so that the rotational speed of the BLDC motor is substantially the same as a requested motor rotational speed.

21. The system according to claim 20, wherein the motor controller comprises a microcontroller.

* * * * *